(12) United States Patent
Luo et al.

(10) Patent No.: US 9,765,573 B2
(45) Date of Patent: Sep. 19, 2017

(54) COMPOSITE TUNGSTEN CARBIDE INSERT WITH HETEROGENEOUS COMPOSITION AND STRUCTURE AND MANUFACTURING METHOD THEREOF

(71) Applicant: Shanghai Gogoal Industry Co., Ltd, Shanghai (CN)

(72) Inventors: Dacheng Luo, Shanghai (CN); Shun Lin, Shanghai (CN); Beibei Chen, Shanghai (CN)

(73) Assignee: Shanghai Gogoal Industry Co., Ltd., Shanghai (CN)

( * ) Notice: Subject to any disclaimer, the term of this patent is extended or adjusted under 35 U.S.C. 154(b) by 0 days.

(21) Appl. No.: 15/283,283

(22) Filed: Sep. 30, 2016

(65) Prior Publication Data

US 2017/0014912 A1 Jan. 19, 2017

Related U.S. Application Data

(63) Continuation of application No. 15/164,804, filed on May 25, 2016.

(30) Foreign Application Priority Data

May 25, 2015 (CN) .......................... 2015 1 0272124

(51) Int. Cl.
*E21B 10/567* (2006.01)
*C04B 35/56* (2006.01)
(Continued)

(52) U.S. Cl.
CPC ............ *E21B 10/5673* (2013.01); *B22F 7/02* (2013.01); *B22F 9/04* (2013.01); *B24D 18/0009* (2013.01);
(Continued)

(58) Field of Classification Search
CPC .. B22F 1/00; B22F 1/0003; B22F 7/02; B22F 7/06; B22F 3/12; B22F 3/16; B22F 5/00;
(Continued)

(56) References Cited

U.S. PATENT DOCUMENTS 4,101,703 A * 7/1978 Schintlmeister ........ C23C 16/30
148/316
4,705,124 A * 11/1987 Abrahamson ............ B21K 5/02
175/426

(Continued)

FOREIGN PATENT DOCUMENTS

| CN | 101301686 A | * 11/2008 |
| CN | 103276268 A | * 9/2013 |
| CN | 103394690 A | * 11/2013 |

OTHER PUBLICATIONS

CN 101301686 A Machine Translation Accessed Nov. 17, 2016.*
CN 103276268 A Machine Translation Accessed Nov. 17, 2016.*
CN 103394690 A Machine Translation Accessed Nov. 17, 2016.*

*Primary Examiner* — Jennifer A Smith
*Assistant Examiner* — Alexandra M Moore
(74) *Attorney, Agent, or Firm* — Mark W Handley

(57) ABSTRACT

A composite tungsten carbide insert (B, I) with heterogeneous composition and structure has a working part (W) and a non-working part (N). The working part (W) is made of a tungsten carbide material consisting of tungsten carbide powder and cobalt powder or nickel. The non-working part (N) is made of a low density tungsten carbide material consisting of titanium carbide powder, tungsten carbide powder, and cobalt powder or nickel powder. During pressing, the tungsten carbide material for the working part (W) and the low density tungsten carbide material for the non-working part (N) are weighed and added to a steel die successively for molding and then sintering. The non-working part (N) which accounts for most of the overall product (Continued)

volume has low density and less material consumption, and can greatly reduce the raw material costs of the product, significantly improving the performance-cost ratio of the insert (B, I).

6 Claims, 3 Drawing Sheets

(51) Int. Cl.
| | |
|---|---|
| *B24D 18/00* | (2006.01) |
| *C22C 29/08* | (2006.01) |
| *B22F 9/04* | (2006.01) |
| *B22F 7/02* | (2006.01) |
| *E21B 10/52* | (2006.01) |

(52) U.S. Cl.
CPC .......... *C04B 35/5626* (2013.01); *C22C 29/08* (2013.01); *B22F 2009/043* (2013.01); *E21B 10/52* (2013.01)

(58) Field of Classification Search
CPC B22F 9/04; B22F 2009/041; B22F 2009/043; B22F 2302/10; B22F 2301/15; B22F 2301/20; C22C 29/08; C22C 1/00; C22C 1/04; C22C 1/0458; C22C 14/00; C22C 38/14; C22C 38/12; C22C 38/50; C22C 38/52; C22C 38/44; B24D 18/00; B24D 18/0009; E21B 10/5673; E21B 10/00; E21B 10/56; E21B 10/52

See application file for complete search history.

(56) References Cited

U.S. PATENT DOCUMENTS

| | | | | |
|---|---|---|---|---|
| 5,131,481 | A * | 7/1992 | Smith | E21B 10/56 |
| | | | | 175/428 |
| 5,467,669 | A * | 11/1995 | Stroud | E21B 10/52 |
| | | | | 175/426 |
| 5,780,139 | A * | 7/1998 | Carter | B01J 3/067 |
| | | | | 428/217 |
| 6,221,479 | B1 * | 4/2001 | Waldenstrom | C22C 1/051 |
| | | | | 428/323 |
| 7,510,032 | B2 * | 3/2009 | Kirk | E21B 10/5673 |
| | | | | 175/420.1 |
| 2008/0179104 | A1 * | 7/2008 | Zhang | B22F 1/0025 |
| | | | | 175/374 |

* cited by examiner

COMPOSITE TUNGSTEN CARBIDE INSERT WITH HETEROGENEOUS COMPOSITION AND STRUCTURE AND MANUFACTURING METHOD THEREOF

CROSS-REFERENCE TO RELATED APPLICATION

The present application claims priority as a continuation of U.S. application Ser. No. 15/164,804, filed May 25, 2016, invented by Dacheng Luo, Xiaobing Lin, and Shun Lin, and assigned to Shanghai Gogal Industry Co., Ltd., and which is related to Chinese Utility Patent Application No. 201510272124.X, Ser. No. 2015052601037000, filed May 25, 2015, and invented by Dacheng Luo, Xiaobing Lin, and Shun Lin, and assigned to Shanghai Gogal Industry Co., Ltd.

TECHNICAL FIELD OF THE INVENTION

The invention relates to a method for manufacturing a spherical button insert and a cylindrical insert from a composite tungsten carbide material with heterogeneous composition and structure.

DESCRIPTION OF THE RELATED ART

Tungsten carbide inserts are formed into spherical buttons and cylindrical inserts for cutter compact products widely applied to DTH hammer bits, roller bits, bore bits, large diameter roller cutter bits and ore crushing equipment. The characteristic is that one end is embedded, stuck or welded in a steel skirt hole for fastening (a non-working part), and the other end is exposed out of the skirt for operation (a working part). Traditional tungsten carbide spherical button inserts and cylindrical inserts are made of materials with homogeneous compositions and structures, and mainly consist of a hard phase (tungsten (WC) or tungsten carbide (TiC)) and a bonding phase (cobalt (Co) or nickel (Ni)). Such tungsten inserts which have homogeneous compositions and structures are characterized by high material costs and low performance-price ratios. In order to improve the performance to price ratio of the products, the homogeneous compositions and structures of the products can be changed to heterogeneous compositions and structures to achieve the purpose of improving the performance to price ratio while ensuring the product performance.

At present, tungsten carbide inserts are formed with heterogeneous compositions and structures exist in the production field of tungsten carbide in China. A composite tungsten carbide spherical button is disclosed in a patent application, Chinese Patent Application No. CN201210181531, entitled Nano-sized Rare Earth Surface Enhanced Gradient Tungsten Carbide Composite Spherical Button for Mining and Preparation Method Thereof, having a surface layer, a transition layer and a core with heterogeneous compositions and structures so as to achieve the purposes of improving both the toughness and wear resistance. Another patent document, Chinese Patent No. CN102699330A, entitled "Method for Preparing Tungsten Carbide Roll Surface Insert" discloses a tungsten carbide insert that uses two heterogeneous WC powder mixed crystal structures (i.e., medium particle and coarse particle) to achieve the purposes of improving both the toughness and wear resistance. Although the two methods properly achieve the purpose of improving the performance by using heterogeneous compositions and structures, compared with traditional homogeneous tungsten carbide spherical button (insert) products, the tungsten carbide spherical buttons (inserts) with heterogeneous compositions and structures have increased material costs and insignificantly improved performance-cost ratios.

SUMMARY OF THE INVENTION

A composite tungsten carbide insert is formed as a spherical button insert or a cylindrical insert with heterogeneous composition and structure and a manufacturing method thereof is disclosed, characterized in that the spherical button insert and the cylindrical insert consist of a working part and a non-working part. The working part is made of a tungsten carbide material consisting of tungsten carbide powder and cobalt powder or nickel powder by weight percentage. The non-working part is made of a low density tungsten carbide material consisting of titanium carbide powder, tungsten carbide powder, and cobalt powder or nickel powder by weight percentage. During pressing, the tungsten carbide material for the working part and the low density tungsten carbide material for the non-working part are weighed and added to a steel die successively for molding, and then the molded product is placed in a sintering furnace for sintering to obtain the composite tungsten carbide insert with heterogeneous composition and structure, either formed into the shape of a spherical button or an end face of a cylindrical insert. The tungsten carbide with heterogeneous composition and structure provides performance to price ratio improvements over existing products of homogenous composition and structure.

The purpose of the invention is to provide a composite tungsten carbide insert with heterogeneous composition and structure and a manufacturing method thereof while significantly improving the performance to cost ratio of the product. In order to achieve the purpose, the technical solution of the invention is to provide a composite tungsten carbide insert with heterogeneous composition and structure, characterized in that the insert consists of a working part and a non-working part, the working part is made of a tungsten carbide material consisting of uniformly mixed tungsten carbide powder (80-92%) and cobalt powder or nickel powder (8-20%) by weight, with a layer thickness of 5-30 mm. The non-working part is made of a low density tungsten carbide material consisting of 30-60% of titanium carbide powder (with a density of 4.93 g/cm$^3$), 20-60% of tungsten carbide powder (with a density of 15.79 g/cm$^3$), and 10-20% of cobalt powder or nickel powder (with a density of 8.9 g/cm$^3$) by weight. During pressing, the tungsten carbide material for the working part is weighed and added to a steel die, then the low density tungsten carbide material for the non-working part is weighed and added to the steel die, a pressure is exerted on the two materials for molding, then the molded product is placed in a sintering furnace for sintering. The resulting sintered product forms two parts, i.e., the composite tungsten carbide insert with homogeneous composition and structure.

DESCRIPTION OF THE DRAWINGS

For a more complete understanding of the present invention and the advantages thereof, reference is now made to the following description taken in conjunction with the accompanying Drawings in which

FIG. 1 is a schematic diagram of the shape of a pressed compact of a composite tungsten carbide spherical button insert with heterogeneous composition and structure;

FIG. 2 is a schematic diagram of the shape of a pressed compact of the composite tungsten carbide cylindrical insert with heterogeneous composition and structure;

FIG. 3 is a schematic diagram of a sintered blank of the composite tungsten carbide spherical button insert with heterogeneous composition and structure;

FIG. 4 is a schematic diagram of a sintered blank of the composite tungsten carbide cylindrical insert with heterogeneous composition and structure;

FIG. 5 is a diagram of a blank sample of the composite tungsten carbide spherical button insert with heterogeneous composition and structure; and FIG. 6 is a diagram of a ground sample of the composite tungsten carbide cylindrical insert with heterogeneous composition and structure.

DETAILED DESCRIPTION OF THE INVENTION

Figure 1:
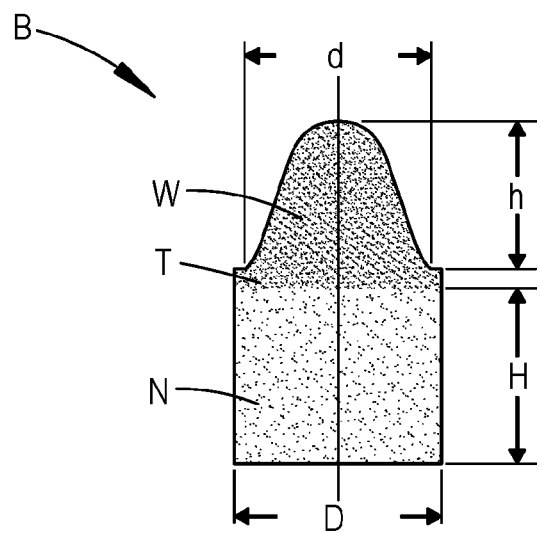
FIGS. 1 through 6 show various aspects for a method for manufacturing composite tungsten carbide insert with heterogeneous composition and structure devices made according to the present invention, as set forth below.

Referring to the Figures, all dimensions shown are in mm FIG. 1 is a schematic diagram of the shape of a pressed compact of a composite tungsten carbide spherical button insert B with heterogeneous composition and structure. The cylindrical button insert B has a working part W, a smooth transition part T, and a non-working part N. The button insert B has a height h and a diameter d. The non-working part N has a button height H and a button diameter D. The spherically shaped profile of the working part W of the button insert B is typically used in mining tools for crushing rock.

Figure 2:
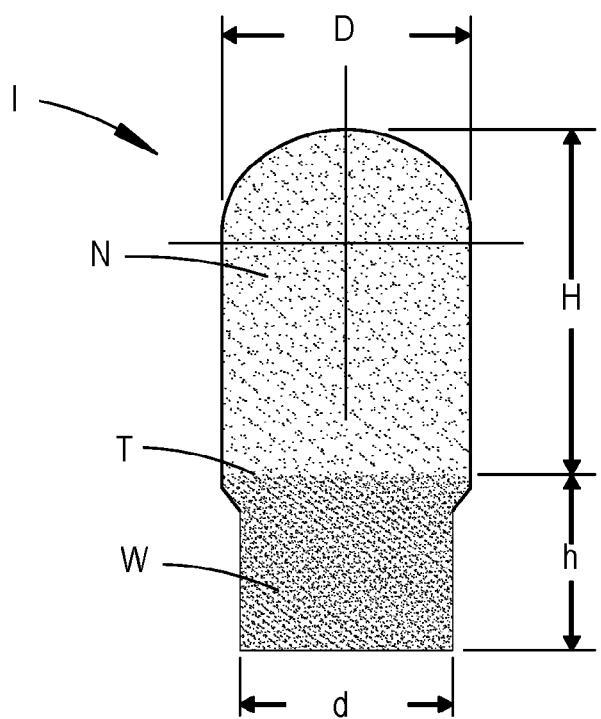

FIG. 2 is a schematic diagram of the shape of a pressed compact of the composite tungsten carbide cylindrical insert I with heterogeneous composition and structure. The insert I has a non-working part N, a working part W and a convex transition part T. The non-working part N has a diameter D, and a height H. The working part W has an insert height h and a diameter d. The end face of the working part W of the cylindrical insert I is typically used in mining tools for shearing rock.

Figure 3:
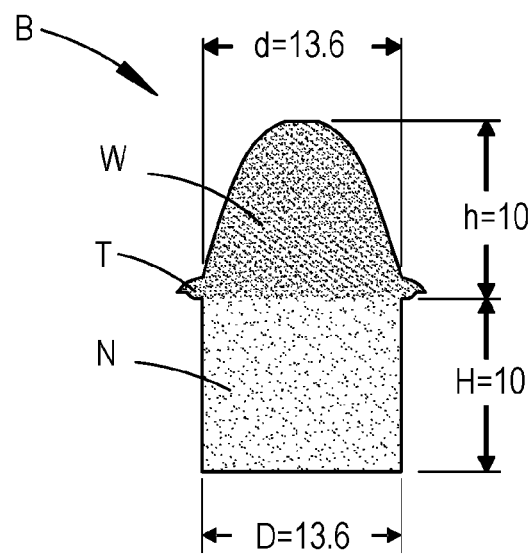

FIG. 3 is a schematic diagram of a sintered blank of the composite tungsten carbide spherical button insert B with heterogeneous composition and structure. The button insert B has a working part W, a convex transition part T, and a non-working part N. The button insert B has a height h equal to 10 mm and a diameter d equal to 13.6 mm. The non-working part N has a button height H equal to 10 mm and a button diameter D equal to 13.6 mm.

Figure 4:
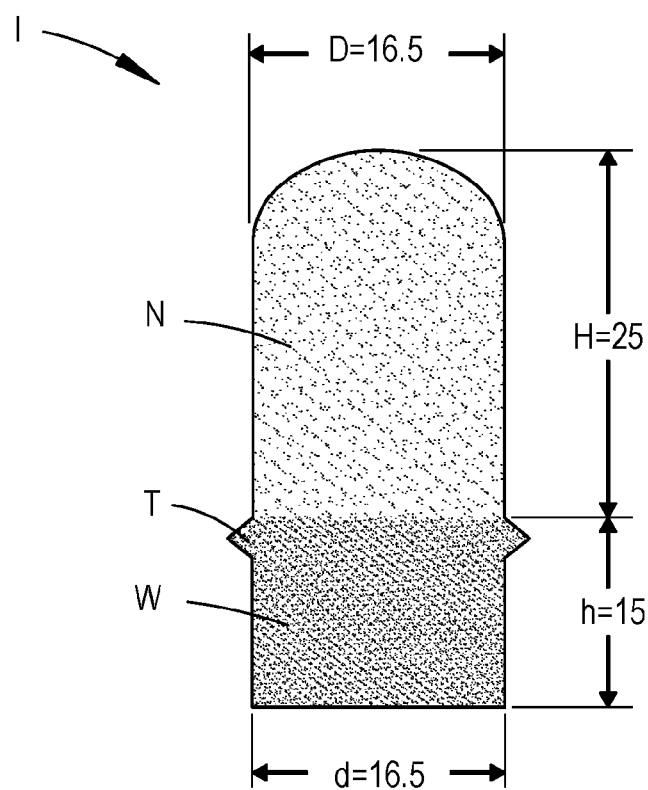

FIG. 4 is a schematic diagram of a sintered blank of the composite tungsten carbide cylindrical insert I with heterogeneous composition and structure. The cylindrical insert I has a non-working part N, a working part W and a smooth transition part T. The non-working part N has a diameter D equal to 16.5 mm and a height H equal to 25 mm. The working part W has an insert height h equal to 15 mm and a diameter d equal to 16.5 mm.

Figure 5:
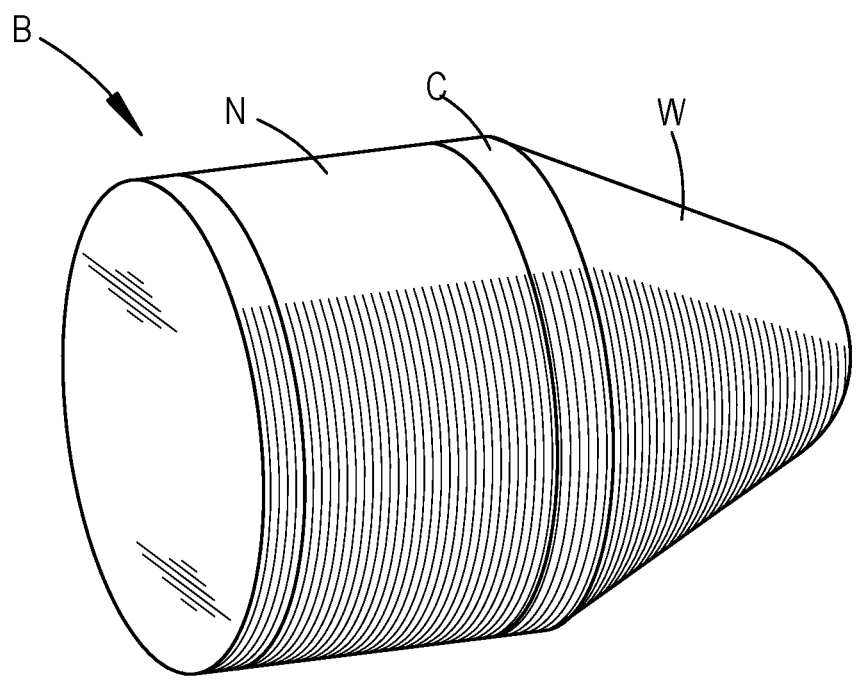
Figure 6:
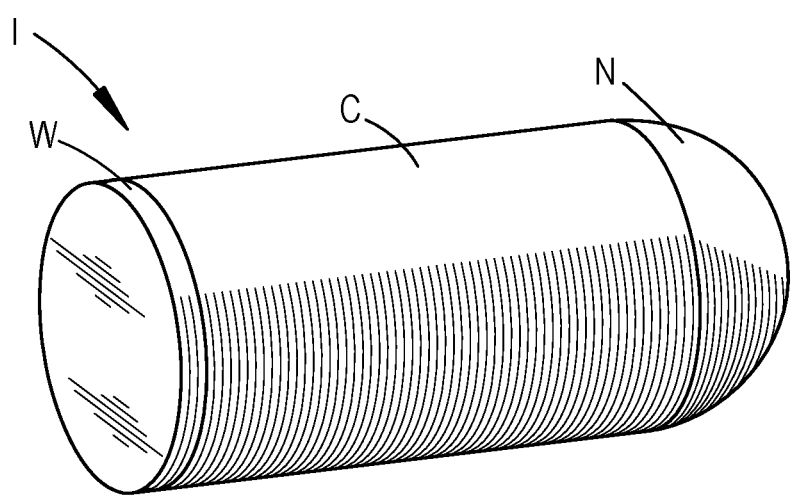

FIG. 5 is a diagram of a blank sample of the composite tungsten carbide spherical button insert B with heterogeneous composition and structure. The button insert B has a working part W, a compound interface C and a non-working part N. The spherically shaped profile of the working part W of the button insert B is typically used in mining tools for crushing rock FIG. 6 is a diagram of a ground sample of the composite tungsten carbide cylindrical insert I with heterogeneous composition and structure. The cylindrical insert I has a working part W, a compound interface C and a non-working part N. The end face of the working part W of the cylindrical insert I is typically used in mining tools for shearing rock.

A method for manufacturing the composite tungsten carbide spherical button insert B or cylindrical insert I with heterogeneous composition and structure, comprising the following steps:

A. Preparing the Tungsten Carbide Material Mixture for the Working Part W:
   a) uniformly mixing 80-92% of tungsten carbide powder and 8-20% of cobalt powder or nickel powder by weight;
   b) placing the mixture in a ball mill for wet milling at room temperature for 24 hours at a ball-to material ratio of 4:1 and solid-to-liquid ratio of 1 kg/300 ml;
   c) recovering alcohol from the milled wet material using a vacuum dryer, and drying in a steam drying oven; and
   d) adding a rubber molding agent to the resulting dried powder at the rubber addition rate of 90 ml/kg, uniformly stirring for 2 minutes, and then sieving through 60-100 meshes.

B. Preparing the Low Density Tungsten Carbide Material Mixture for the Non-working Part N:
   a) uniformly mixing 30-60% of titanium carbide powder (with a density of 4.93 g/cm$^3$), 20-60% of tungsten carbide powder (with a density of 15.79 g/cm$^3$), and 10-20% of cobalt powder or nickel powder (with a density of 8.9 g/cm$^3$) by weight;
   b) placing the mixture in a ball mill for wet milling at room temperature for 24 hours at a ball-to material ratio of 4:1 and solid-to-liquid ratio of 1 kg/300 ml;
   c) recovering alcohol from the milled wet material using a vacuum dryer, and drying in a steam drying oven; and
   d) adding a rubber molding agent to the resulting dried powder at the rubber addition rate of 120 ml/kg, uniformly stirring for 2 minutes, and then sieving through 60-100 meshes.

C. Pressing for Molding:
   a) due to some differences in shrinkage of the two mixtures, in order to prevent distortion of the button B or the insert I after sintering affecting dimensional tolerance, and failing to meet the use requirements, prefabricating a convex pressed compact, the crosshead end being used as the working part W, with shrinkage coefficient of 1.20-1.25, and the butt end being used as the non-working part N, with shrinkage coefficient of 1.26-1.30, and allowing the joint interface between the working part W and the non-working part N to be in smooth transition; and
   b) weighing and adding the mixture of the tungsten carbide powder and cobalt powder (or nickel powder) for the working part W to a steel die, then weighing and adding the mixture of the titanium carbide powder, tungsten carbide powder and cobalt powder or nickel powder for the non-working part N to the steel die, and exerting 60-100 Mpa/cm$^3$ pressure for molding;

D. Sintering:
   a) placing the molded product in a sintering furnace for sintering at temperature of 1420-1460° C., and holding for 2-3 hours.

E. Machining Product Surface:
   grinding the surface of the sintered product to size, and warehousing after satisfactory inspection.

The rubber molding agent from steps A(d) and B(d) above may be provided by SD Liquid Cement, which is a rubber molding agent commercially available from Zhuzhou Cemented Carbide Group Co., Ltd. of China. A gasoline rubber molding agent may also be used. The rubber molding agent holds the holds the material in place during sintering, and burns off during sintering since it is formed of rubber.

The sieve sizes noted correlate to 60 mesh having opening sizes of 250 (μm) and 100 mesh having opening sizes of 150 (μm).

The tungsten carbide for the non-working part N refers to electrolytic tungsten carbide from recovered tungsten carbide scraps or crushed powder from recovered tungsten carbide, and the tungsten carbide costs less than primary tungsten carbide.

In a formulation of the composite tungsten carbide spherical button insert B and the cylindrical insert I with heterogeneous composition and structure of the invention, the working part W is made of a conventional tungsten carbide, cobalt or nickel tungsten carbide material, and the non-working part N is made of a low-cost and low-density tungsten carbide material. The tungsten carbide spherical button insert B and the cylindrical insert I product manufactured using the preparation process has the following advantages: compared with the tungsten carbide spherical button insert B or the cylindrical insert I with heterogeneous composition and structure in the patent application (patent No.: CN201210181531) entitled Nano-sized Rare Earth Surface Enhanced Gradient Tungsten Carbide Composite Spherical Button for Mining and Preparation Method Thereof and that in patent document (patent No.: CN102699330A) entitled Method for Preparing Tungsten Carbide Roll Surface Insert, the composite tungsten carbide spherical button insert B or the cylindrical insert I with heterogeneous composition and structure of the invention has the non-working part N accounted for most of the overall product volume, has low density, less material consumption of a single product and low raw material costs, and can greatly reduce the raw material costs of the product without changing quality performance and use requirements of the tungsten carbide spherical button insert B or the cylindrical insert I product, thus achieving the purpose of significantly improving the performance-cost ratio of the product.

Example 1. A Composite Tungsten Carbide Spherical Button Insert with Heterogeneous Composition and Structure The product is composed of two parts, i.e. a working part W consisting of 90% of tungsten carbide and 10% of cobalt by weight, and a non-working part N consisting of 50% of titanium carbide, 30% of tungsten carbide and 20% of cobalt and nickel by weight. Refer to FIG. 1, FIG. 3 and FIG. 5 for the shapes of the pressed compact, the sintered blank and the physical blank required. The process steps are briefly stated as follows: weighing and uniformly mixing the components by weight percentage; placing the mixtures for the working part W and the non-working N part into different ball mills for wet milling at room temperature for 24 hour at a ball-to-material ratio of 4:1 and solid-to-liquid ratio of 1 kg/300 ml; recovering alcohol from the milled wet powder for the working part W and the non-working part N using vacuum dryers (Z mixer) respectively, and drying in steam drying ovens; adding an SD liquid cement or gasoline rubber molding agent to the resulting dried powder at the rubber addition rate of 90 ml/kg for the working part W and the rubber addition rate of 120 ml/kg or the non-working part N, uniformly stirring for 2 minutes, and then sieving through 60-100 meshes; weighing 7.5 g powder for the working part W and adding the powder to a steel die, then weighing 11.5 g powder for the non-working N part and adding the powder to the steel die, and exerting 60-100 Mpa/cm$^3$ pressure for molding (refer to FIG. 1 for the shape of the pressed compact); placing the pressed and molded product in a sintering furnace for sintering at temperature of 1420-1460° C., and holding for 2-3 hours (refer to FIG. 3 and FIG. 5 for the shape and dimension of the resulting sintered product); and machining the surface of the sintered product by coreless grinding to allow the product dimension to meet requirements, and warehousing after satisfactory inspection. The product is determined by sampling to obtain the following results: integrated density: 9.20 g/cm$^3$, hardness of the working part W: 88.5 HRA, porosity of the working part: A02, BO3O and COO.

Example 2. A Composite Tungsten Carbide Cylindrical Insert I with Heterogeneous Composition and Structure The product is composed of two parts, i.e. a working part W consisting of 85% of tungsten carbide and 15% of cobalt by weight, and a non-working part N consisting of 30% of titanium carbide, 55% of tungsten carbide and 15% of cobalt and nickel by weight. Refer to FIG. 2, FIG. 4 and FIG. 6 for the shapes of the pressed compact, the sintered blank and the physical blank required. The process steps are briefly stated as follows: weighing and uniformly mixing the components by weight percentage; charging the mixtures for the working part W and the non-working part N into different ball mills for wet milling at room temperature for 24 hours at a ball-to-material ratio of 4:1 and solid-to-liquid ratio of 1 kg/300 ml; recovering alcohol from the milled wet powder for the working part W and the non-working part N using vacuum dryers (Z mixer) respectively, and drying in steam drying ovens; adding a rubber molding agent to the resulting dried powder at the rubber addition rate of 90 ml/kg for the working part W and the rubber addition rate of 120 ml/kg for the non-working part N, uniformly stirring for 2 minutes, and then sieving through 60-100 meshes; weighing 44.5 g powder for the working part W and adding the powder to a steel die, then weighing 49 g powder for the non-working N part and adding the powder to the steel die, and exerting 60-100 Mpa/cm$^3$ pressure for molding (refer to FIG. 2 for the shape of the pressed compact); placing the pressed and molded product in a sintering furnace for sintering at temperature of 1420-1460° C., and holding for 2-3 hours (refer to FIG. 4 for the shape and dimension of the resulting sintered product); and machining the surface of the sintered product by coreless grinding to allow the product dimension to meet requirements, and warehousing after satisfactory inspection (refer to FIG. 6 for the machined physical sample). The product is determined by sampling to obtain the following results: integrated density: 10.5 g/cm$^3$, hardness of the working part: 86.5 HRA, porosity of the working part: A02, B02 and COO.

The present invention provides advantages over conventional tungsten carbide compact inserts with composite tungsten carbide spherical button inserts and cylindrical inserts having heterogeneous composition and structure. The non-working part of the spherical button inserts and the cylindrical inserts account for most of the overall product volume, and according to the present invention is provided with low density and less material consumption to greatly reduce the raw material costs of the products, thus achieving the purpose of significantly improving the performance to cost ratio of the product.

Although the preferred embodiment has been described in detail, it should be understood that various changes, substitutions and alterations can be made therein without departing from the spirit and scope of the invention as defined by the appended claims.

What is claimed is:

1. A composite tungsten carbide insert with heterogeneous composition and structure, comprising:
    the insert being a button or cylindrical insert for cutter compact products having a working part and a non-working part;
    the working part is made of a tungsten carbide material consisting of tungsten carbide powder (80-92%) uniformly mixed with cobalt powder or nickel powder (8-20%) by weight, with a layer thickness of 5-30 mm;
    the non-working part is made of a uniform mixture of a low density tungsten carbide material consisting of 30-60% of titanium carbide powder (with a density of 4.93 g/cm$^3$), 20-60% of tungsten carbide powder (with a density of 15.79 g/cm$^3$), and 10-20% of cobalt powder or nickel powder (with a density of 8.9 g/cm$^3$) by weight; and
    wherein during pressing, the tungsten carbide material for the working part is weighed and added to a steel die, then the low density tungsten carbide material for the non-working part is weighed and added to the die, a pressure is exerted on the two materials for molding, then the molded product is placed in a sintering furnace for sintering, and the resulting sintered product forms the composite tungsten carbide insert.

2. The composite tungsten carbide insert with heterogeneous composition according to claim 1, wherein the insert is formed such that the working part is semi-spherical in shape.

3. The composite tungsten carbide insert with heterogeneous composition according to claim 1, wherein the insert is formed such that the working part is cylindrical in shape, having an end face.

4. A method for manufacturing a composite tungsten carbide insert with heterogeneous composition and structure, wherein the composite tungsten carbide insert is a button or cylindrical insert for cutter compact products having a working part and a non-working part, the method comprising the following steps:
    A. preparing a first mixture of tungsten carbide material for the working part by:
        (a) uniformly mixing 80-92% of tungsten carbide powder and 8-20% of cobalt powder or nickel powder by weight;
        (b) placing the first mixture in a ball mill for wet milling at room temperature for 24 hours at a ball-to-material ratio of 4:1 and solid-to-liquid ratio of 1 kg/300 ml;
        (c) recovering alcohol from the milled wet material of the first mixture using a vacuum dryer, and drying in a steam drying oven; and
        (d) adding a rubber molding agent to a resulting dried powder from the first mixture at the rubber addition rate of 90 ml/kg, uniformly stirring for 2 minutes, and then sieving through 60-100 meshes;
    B. preparing a second mixture of a low density tungsten carbide material for the non-working part by:
        (a) uniformly mixing 30-60% of titanium carbide powder (with a density of 4.93 g/cm$^3$), 20-60% of tungsten carbide powder (with a density of 15.79 g/cm$^3$), and 10-20% of cobalt powder or nickel powder (with a density of 8.9 g/cm$^3$) by weight;
        (b) placing the second mixture in a ball mill;
        (c) wet milling the second mixture in the ball mill at room temperature for 24 hours at a ball-to-material ratio of 4:1 and solid-to-liquid ratio of 1 kg/300 ml;
        (d) recovering alcohol from milled wet material of the second mixture placed in the ball mill using a vacuum dryer, and drying in a steam drying oven; and
        (e) adding a rubber molding agent to a resulting dried powder from the second mixture at the rubber addition rate of 120 ml/kg, uniformly stirring for 2 minutes, and then sieving through 60-100 meshes;
    C. pressing for molding:
        (a) prefabricating a convex pressed compact, a crosshead end being used as the working part, with shrinkage coefficient of 1.20-1.25, and a butt end being used as the non-working part, with shrinkage coefficient of 1.26-1.30, and a joint interface between the working part and the non-working part to be in smooth transition; and
        (b) weighing and adding the first mixture of the tungsten carbide material for the working part to a steel die, then weighing and adding the second mixture of the low density tungsten carbide material for the non-working part to the steel die, with the second mixture uniformly mixed, and exerting 60-100 Mpa/cm$^3$ pressure for molding;
    D. sintering by placing the molded product in a sintering furnace for sintering at temperature of 1420-1460° C., and holding for 2-3 hours; and
    E. machining product surface by grinding the surface of the sintered product to size, and warehousing after satisfactory inspection.

5. The method for manufacturing a composite tungsten carbide insert with heterogeneous composition and structure according to claim 4, wherein the insert is formed such that the working part is semi-spherical in shape.

6. The method for manufacturing a composite tungsten carbide insert with heterogeneous composition and structure according to claim 4, wherein the insert is formed such that the working part is cylindrical in shape, having an end face.

* * * * *